United States Patent [19]

Pender

[11] 4,127,244

[45] Nov. 28, 1978

[54] ROTARY WING AIRCRAFT MAST ARRANGEMENT

[76] Inventor: David R. Pender, 1018 Marion St., Columbia, S.C. 29201

[21] Appl. No.: 799,174

[22] Filed: May 23, 1977

Related U.S. Application Data

[62] Division of Ser. No. 735,130, Oct. 26, 1976.

[51] Int. Cl.² ............................................. B64C 27/22
[52] U.S. Cl. ................................ 244/7 R; 244/17.27; 416/142; 416/244 R
[58] Field of Search ...................... 244/7, 17.11, 17.27; 248/3, 5, 10, 9, 22, 358 R; 267/63 A, 63 R, 152, 148; 416/244 R, 246, 148, 149, 142

[56] References Cited

U.S. PATENT DOCUMENTS

| | | | |
|---|---|---|---|
| 3,050,274 | 8/1962 | Haight | 244/7 R |
| 3,612,506 | 10/1971 | Malherbe | 267/152 |
| 3,762,667 | 10/1973 | Pender | 244/7 A |
| 3,920,202 | 11/1975 | Mouille | 244/17.27 |

FOREIGN PATENT DOCUMENTS

| | | | |
|---|---|---|---|
| 177157 | 1/1954 | Austria | 267/63 A |
| 674319 | 3/1939 | Fed. Rep. of Germany | 248/10 |
| 1380710 | 1/1975 | United Kingdom | 244/17.27 |
| 399655 | 10/1973 | U.S.S.R. | 267/148 |

Primary Examiner—Galen L. Barefoot
Attorney, Agent, or Firm—B. P. Fishburne, Jr.

[57] ABSTRACT

A universally flexible rotor mast for a rotary wing aircraft wherein the universal flexing of the mast is accomplished by the use of multiple elastomer mounts of elastomer metal plate sandwich formation and with high strength cables embedded in the elastomer and anchored to opposing metal plates of the sandwich mounts. A static on-ground rotor mast lock is employed to secure the rotor mast in an upright position, the mast lock is used in conjunction with the elastomer mounts of the flexible mast.

1 Claim, 10 Drawing Figures

FIG. 6
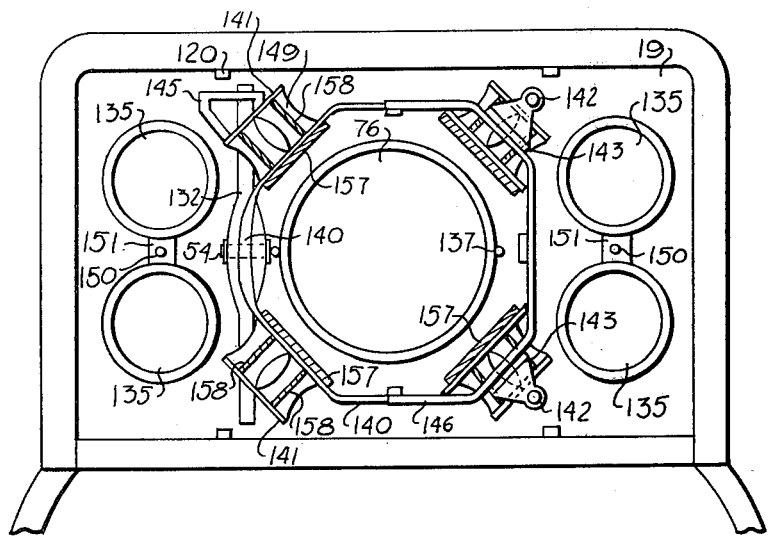
FIG. 7
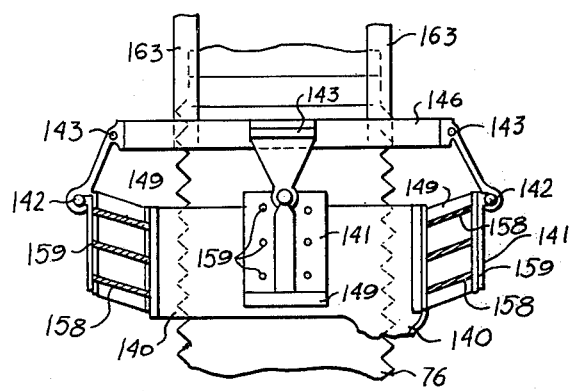
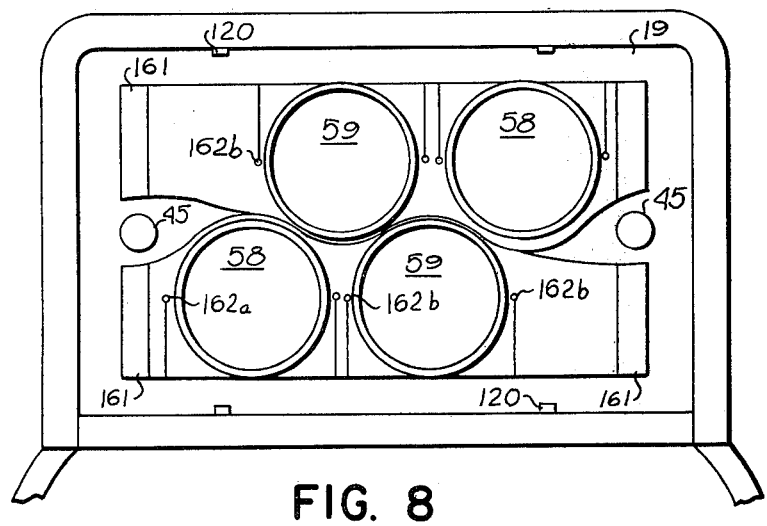
FIG. 8

ROTARY WING AIRCRAFT MAST ARRANGEMENT

This is a division of application Ser. No. 735,130, filed Oct. 26, 1976.

BACKGROUND OF THE INVENTION

This invention relates to improvements in aircraft, and more particularly to improvements in vertical take-off and landing (VTOL) aircraft of the tail-lifter type as shown in prior U.S. Pat. Nos. 3,582,021 and 3,762,667, David R. Pender.

Among the objects of this invention is to provide an improved universally flexible mast structure for the tail lifting rotor of the craft which employs as its major components, elastomeric shock absorbing rotor mast mounts, a parking rotor mast latch means, a main rotor mast tilt hinge equipped with hydraulic damping means, and improved flexible duct units.

These and other features and advantages of the invention will become further apparent during the course of the following description.

BRIEF DESCRIPTION OF DRAWING FIGURES

FIG. 6 is a cross sectional view of the rotor mast in the vicinity of the 90° mast tilt joint showing the center hot gas duct, the four by-pass control ducts, and the four flexible mast elastomer mount units.

FIG. 7 is a cross sectional view of FIG. 6 to further illustrate the design of the flexible mast elastomer units.

FIG. 8 is a veiw also taken in the rotor stowage tube and showing the folded rotor blade roots at the point where the blade flexible ducts enter the blade roots.

DETAILED DESCRIPTION

Figure 1:
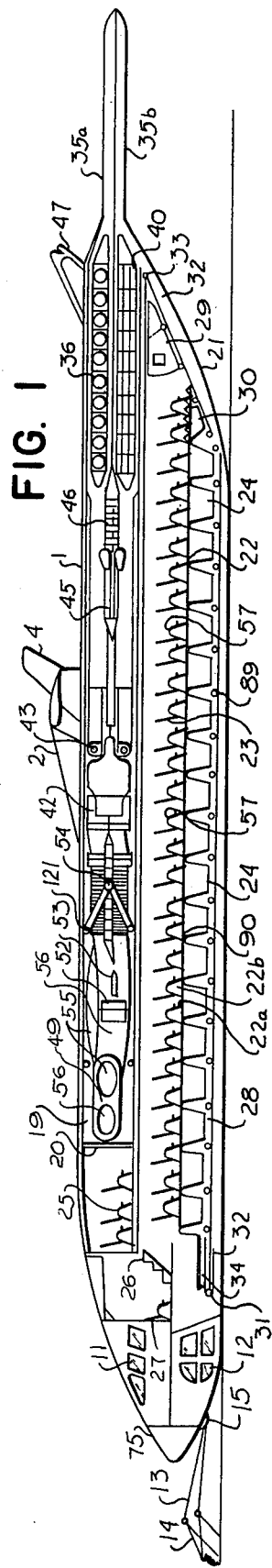
FIG. 1 is a partly schematic cross sectional side elevation of an aircraft embodying the invention.

The rotor mast forming the subject matter of this invention has some flexibility in any direction (up to 10°–15°) and tilts a full 90° on a lateral hinge axis on take-off and landing. Its major components are: the elastomeric shock-absorbing rotor mast mounts 141; the parking rotor mast latch 47; the main rotor mast tilt hinge 54; rotor mast tilt hinge hydraulic dampers 147a; and the flexible duct units 76, 135, 58 and 59.

There are four elastomeric mounts 141 spaced more-or-less 90° apart, FIGS. 3, 4, 6 and 7, with the inside of each elastomer bonded to lower tilting main mast 140 and the outside of each elastomer bonded to a plate 141 on which is attached a ball joint 142 which receives a hinge connector 143 which is attached to the lower 'unsprung' non-rotating portion of the rotor mast 146. Embedded in the elastomer 149 are cables 158 connecting the inner plate 140 to the outer plate 141 with cable anchor ends 159.

When the rotor lifts the aircraft, the outer plates 141 of the elastomer mounts are pulled upwardly, putting the elastomer in shear and putting the embedded cables in tension, which compresses the elastomer sandwich so that the elastomeric sandwich is in a combination of shear and compression.

Figure 3:
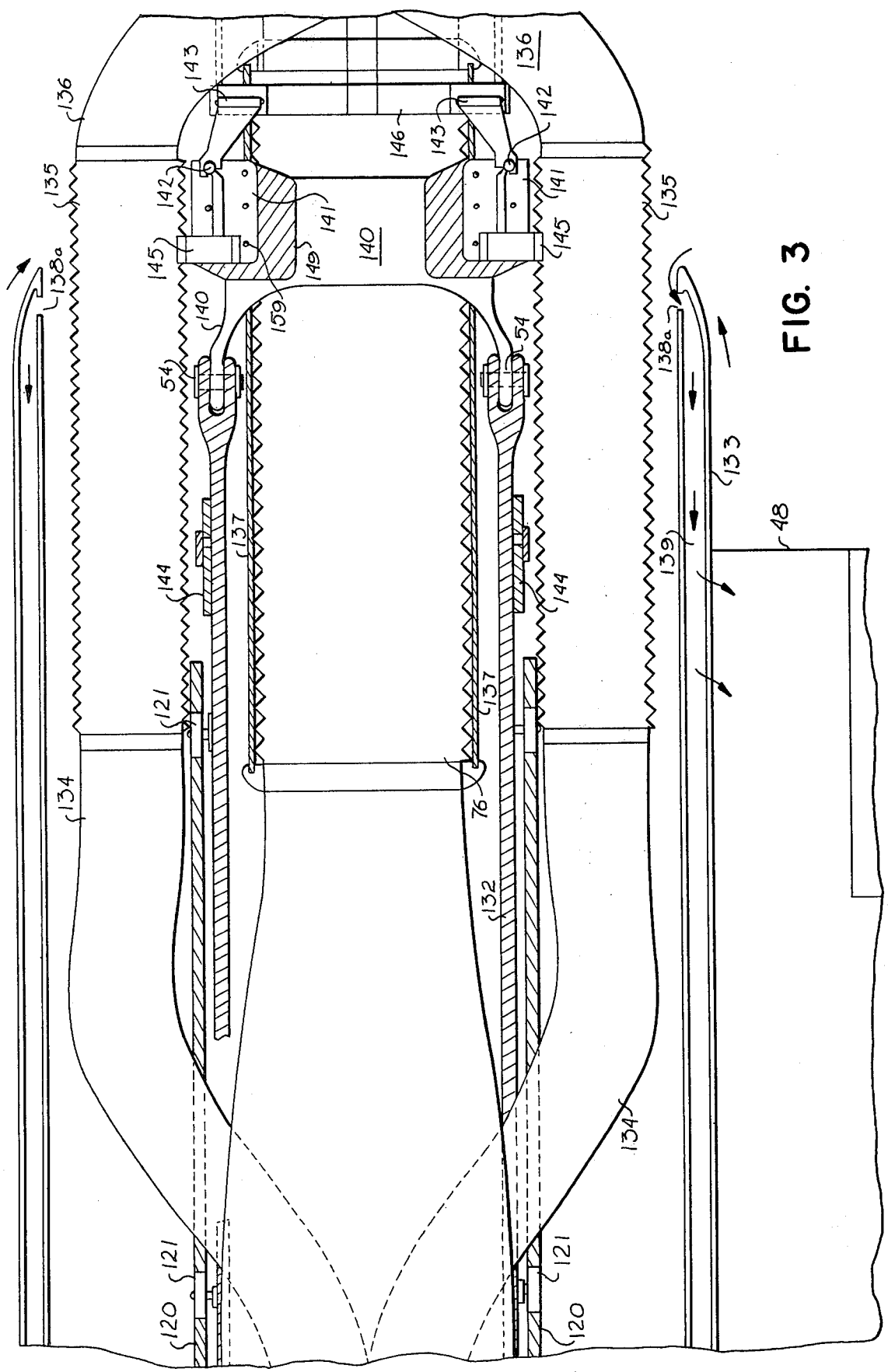
FIG. 3 is a top view of the rotor mast at the 90° tilt joint showing the hot and by-pass air flexible ducts and also showing the flexible mast elastomer mount units.
Figure 4:
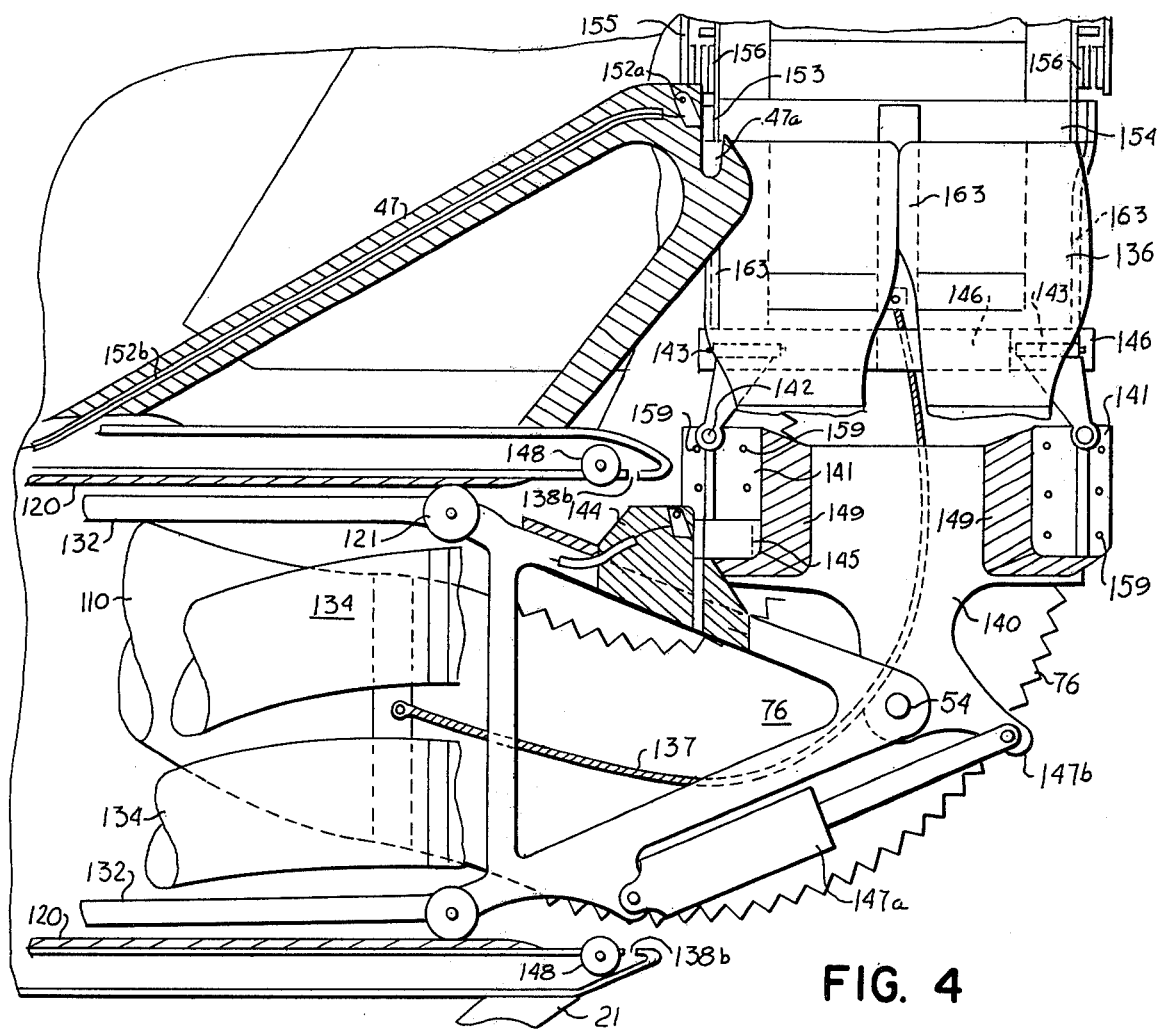
FIG. 4 is a side cut-away view at the end of the stowage tube showing the 90° tilt-up mast support joint, the hot gas duct (with by-pass ducts cut away), the flexible mast elastomer units, and the on-ground rotor mast lock.
Figure 5:
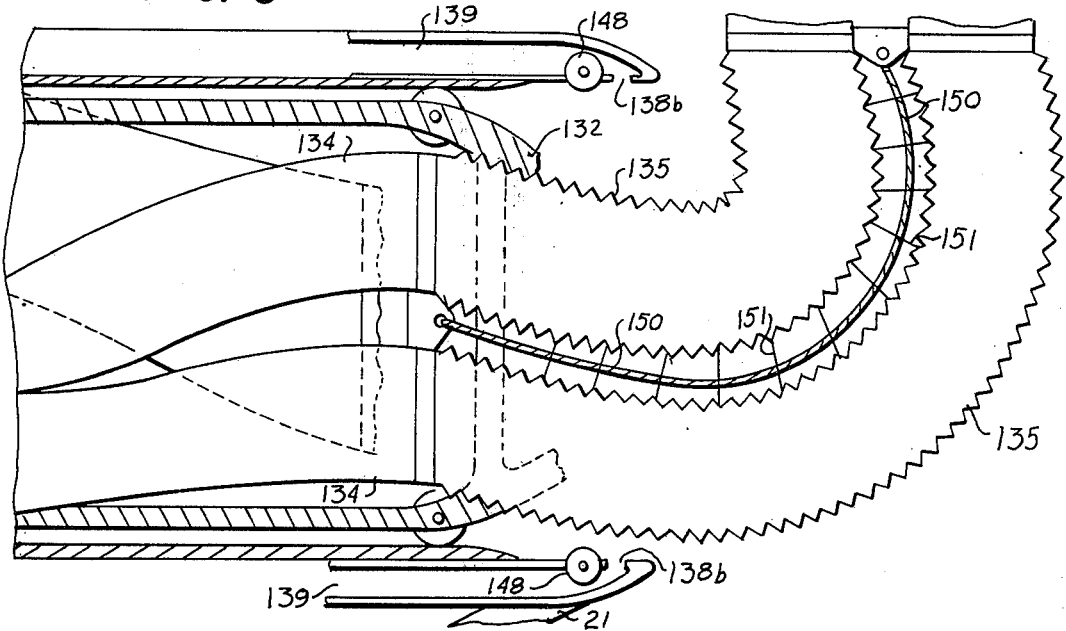
FIG. 5 is a view similar to FIG. 4, but showing only rotor control by-pass ducts.
Figure 9:
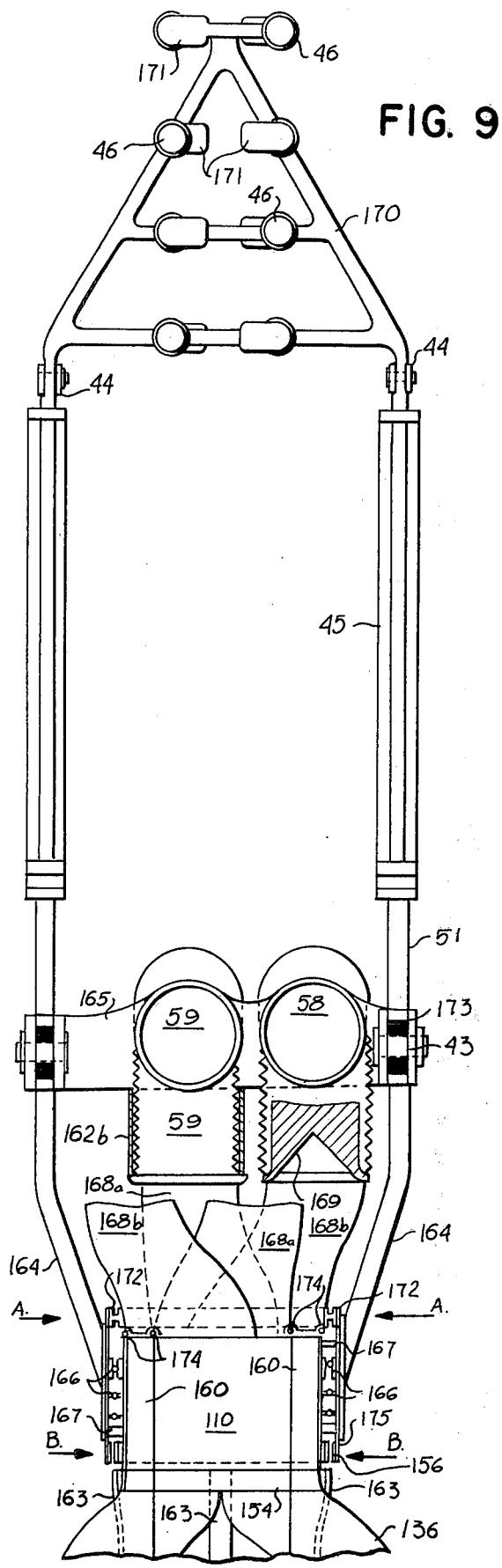
FIG. 9 is a side, cut-away view of the upper part of the rotor mast also showing the hot and by-pass flexible ducts entering the blade roots and showing the rotor mast extension.
Figure 10:
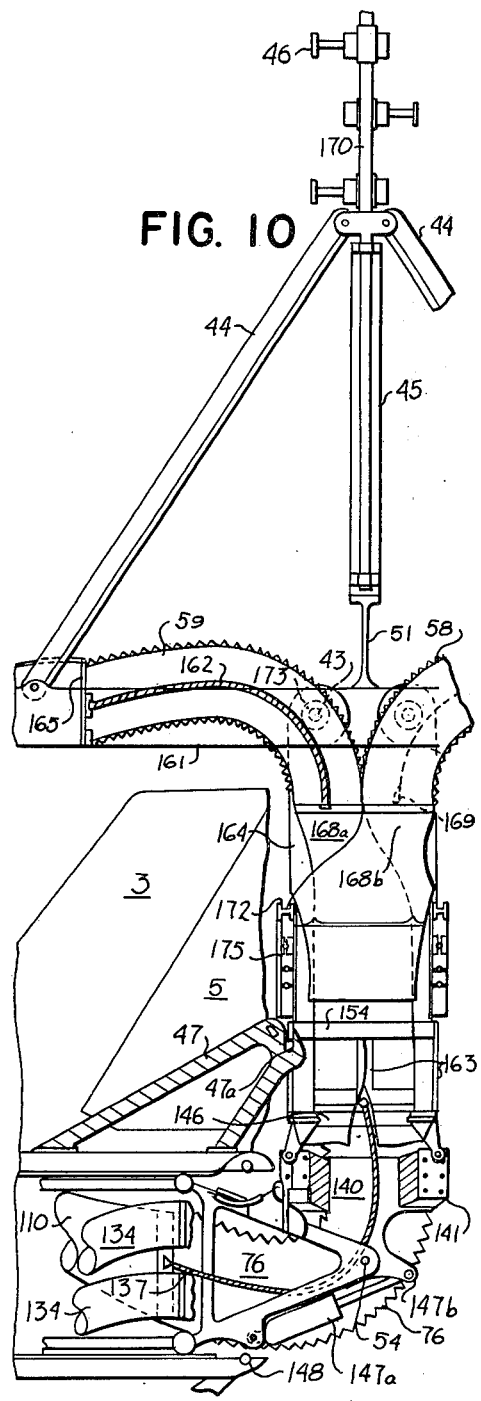
FIG. 10 is a view similar to FIG. 9, on a reduced scale, taken at a 90° angle, showing the lower portion of the rotor mast down to the inside of the rear of the stowage tube.

The elastomer mounts are shown under load in FIGS. 3, 4 and 7.

The purposes of the elastomeric mounts are to provide a flexible mast that can tilt in any direction and act as a shock absorber that reduces transmission of rotor vibration to the fuselage. The embedded cables are necessary to carry most of the load because the elastomeric mounts, in shear, without the cables, are not capable of supporting the required load, considering the mounts must be small enough to fit in the available space in the stowage tube.

The cables are also a safety feature. The elastomeric shock mounts must of necessity be close to the center hot gas duct 76. In normal operation, this is no problem. The mounts are separated from the hot gas ducts by heat insulator pads 157, FIG. 6. Also, cooling air is continually drawn in the mouth of the stowage tube which draws cool air over the elastomeric mounts to prevent heat build-up on the mounts. If there is an accident, such as a rupture of the gas duct, this could quickly melt down the heat sensitive elastomer. However, the embedded steel cables would hold and allow an emergency landing.

The cable unit without the elastomer is equally unacceptable. The tail-lifter fuselage, dangling from the rotor on free-swinging cables, allows sideways sway between the two parts of the rotor mast connected by the cables; and the flapping of the rotor blades would tend to exert a rhythmic sideways force on the rotor mast which the free-swinging cables would permit to build up into potentially destructive harmonic vibrations. This rhythmic sideways force on the rotor mast is accentuated by the semi-rigid nature of the rotor, to be further described, whereby the blades are not completely free to swing up and down and, hence, the up-down movement of the blades is in part translated to sideways movement of the rotor mast. Also, the free-swinging cables would allow some unacceptable twisting force between the two parts of the mast connected by the cables. In addition, the free-swinging cables do not provide for an acceptable method of ground support of the rotor mast.

Therefore, the elastomer without the cable is unacceptable, and the cables without the elastomer are equally unacceptable. It is the combination of the cables embedded in the elastomer whereby the cable movement is restricted, and put in tension, which puts the elastomer in a combination of shear and compression that form an essential part of the rotor control system.

The hydraulic cylinder damper 147a, which is connected to the damper crank arm 147b, serves to restrict tilt hinge 54 movement during rotor flight and to force all relative movement between the upper and lower mast to pass through the elastomeric mounts during rotor flight. That is, once the tail-lifter clears the ground, this damper prevents the rotor from setting up back and forth movement or vibration in the tilt hinge 54. This may be a passive damper; or, if needed, it could be a hydraulic cylinder, with on-off valves to completely lock the cylinder and immobilize the tilt hinge once the mast is in a more-or-less straight position during rotor flight.

Figure 2:
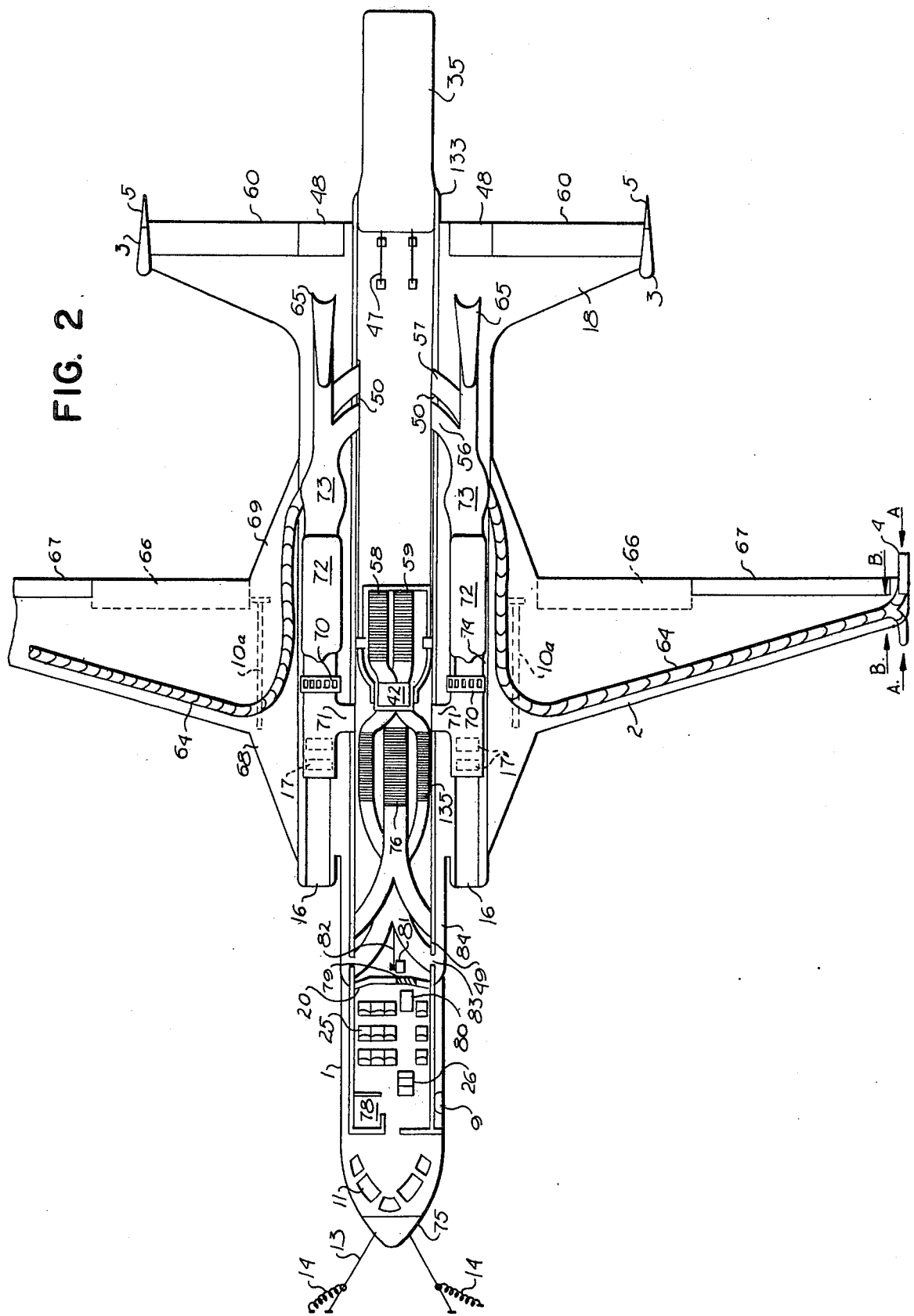
FIG. 2 is a partly schematic plan view of the aircraft cut away to show components of the retracted rotor in the rotor stowage tube and other features.

The parking rotor mast latch 47 works in conjunction with the elastomeric rotor mast mounts 141. There are two separate rotor mast latches 47 set on top of the stowage tube opening. The latch locations are shown in small scale, FIG. 2. On landing, as the fuselage settles on the ground and as the mast tilts 90° (relative to the fuselage), and as fuselage weight is removed from the rotor, two latch hook receivers 153, which are attached to the sides of the upper non-rotating main mast supports 154, settle down into the latch slot 47a on latch 47, FIG. 4. The lowering of the mast, with the latch hook receivers 153 is made possible by the mounts 141. As aircraft weight is taken off the rotor, the positive upward pull on the shock mounts reverses to a downward push on the mounts until most of the weight of the rotor unit rests on the shock mounts. Some of the rotor weight could be on the latches 47 as the latch hooks 153 rest on the bottom of the latch slot 47a on latch 47.

When the latch hook 153 descends near the bottom of the latch slot 47a, the mast latch down lock 152a automatically locks the rotor mast securely in place. For take-off, the pilot pulls the down lock release cable 152b to allow the spinning rotor to lift the mast, and the latch hood receiver 153 up and out of the slot 47a in the parking rotor mast latch 47 to free the mast from the latch.

If desired, the rotor mast latch units 47 can be designed to retract or fold down flat in recesses in the top of the stowage door. The retraction of the latches will reduce fixed-wing flight drag and keep the latches out of the path of diverted rudder air flow for increased rudder effectiveness if twin rudders are placed on top of the stowage opening as shown in FIGS. 26 and 69.

There is an alternate latch unit system consisting of parts 144 and 145, FIGS. 3, 4, 6 and 10. FIGS. 3 and 4 show only the alternate latch system. The only differences in the two systems are that the alternate latch 144 is mounted directly on the main load-carrying support unit 132 and the latch receiver 145 is mounted directly on the outer plate of the elastomeric mount units 141. This alternate latch system retracts with the rotor which had the advantage of not causing drag or rudder interference during fixed-wing flight. Its main disadvantage is that high leverage on the alternate latch would put excessive stress on the latch so that it may not be built strong enough to hold.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A rotor craft having a universally flexible rotor mast, said mast comprising multiple elastomer mounts of sandwich formation including elastomer bodies bonded with metal plates arranged to be parallel to a load to be supported, high strength cables embedded in the elastomer bodies and anchored to the two opposing metal plates of the sandwich formation, said cables being substantially perpendicular to the faces of said opposing metal plates when there is no load on the mount, whereby under loading the elastomer of the sandwich formation is subjected to shearing stress, thereby placing the embedded cables under tension with a substantial component of the load carried by the cables, the embedded cables while under tension compressing the elastomer of the sandwich formation so that it is then under combined shear and compression stresses, and a static on-ground rotor mast lock to secure the rotor mast in an upright position and operating in conjunction with said mounts, said rotor mast lock constructed so that the latch receiving units thereof are attached to the upper non-rotating portion of the rotor mast and mating latch units formed above the opening of a stowage tube of the rotor craft, whereby on landing the rotor craft fuselage settles to a horizontal position and the rotor mast tilts until said latch receiving units on the mast come into contact with an upper surface stop of said mating latch units, said latch units having a trough at the bottom thereof so that as the fuselage settles to the ground and weight is removed from the rotor, the elastomer mounts allow the mast to be lowered, the mast latch receiving unit also being lowered and settling in said trough, and a spring-loaded latch lock automatically securing the latch receiving unit in said trough to lock the rotor mast, said latch lock being releasable by a pilot of the rotor craft on take off.

* * * * *